United States Patent [19]

Anderson

[11] 4,394,025

[45] Jul. 19, 1983

[54] PIPE COMPRESSION SEAL FOR BELL AND SPIGOT JOINT

[75] Inventor: Kenneth W. Anderson, Springfield, Ill.

[73] Assignee: Anderson Seal Company, Inc., Springfield, Ill.

[21] Appl. No.: 319,297

[22] Filed: Nov. 9, 1981

[51] Int. Cl.³ .................. F16J 15/10; F16L 21/02
[52] U.S. Cl. ............................ 277/207 A; 277/186; 285/230; 285/231; 285/291; 285/345
[58] Field of Search ........................... 277/181–183, 277/186, 189, 207 R, 207 A; 285/21, 230, 231, 291, 345, 347, 374, 110

[56] References Cited

U.S. PATENT DOCUMENTS

| | | | |
|---|---|---|---|
| 2,401,554 | 6/1946 | Davids | 285/291 |
| 2,537,659 | 1/1951 | Eisner et al. | 285/291 X |
| 3,135,519 | 6/1964 | Ligon et al. | 285/231 X |
| 3,759,285 | 9/1973 | Yoakum | 285/230 X |
| 4,084,828 | 4/1978 | Jones | 277/207 A |
| 4,186,931 | 2/1980 | Anderson | 277/207 A |

FOREIGN PATENT DOCUMENTS

| | | | |
|---|---|---|---|
| 241927 | 8/1965 | Austria | 277/207 A |
| 269007 | 3/1969 | Austria | 277/207 A |
| 1334436 | 7/1963 | France | 285/291 |

*Primary Examiner*—Robert S. Ward, Jr.
*Attorney, Agent, or Firm*—LeBlanc, Nolan, Shur & Nies

[57] ABSTRACT

An improved seal system for the bell and spigot joint of a concrete pipe. The seal includes a bell sealing ring and a spigot sealing ring, each constructed of plastic material which when the spigot is received in the bell form a compression seal which will withstand substantial internal pressure without leaking. The ring members include, respectively, outwardly directed and inwardly directed ridges or flanges which are embedded in the respective bell and spigot ends of the concrete pipe. The spigot end ring, however, includes a central concave depression which extends into the concrete and receives an O-ring, and a lower depending flange also embedded in the concrete forming the spigot end. The joint of this invention then forms a reinforced concrete pipe capable of withstanding substantial internal pressure at least up to 50–60 pounds per square inch.

5 Claims, 7 Drawing Figures

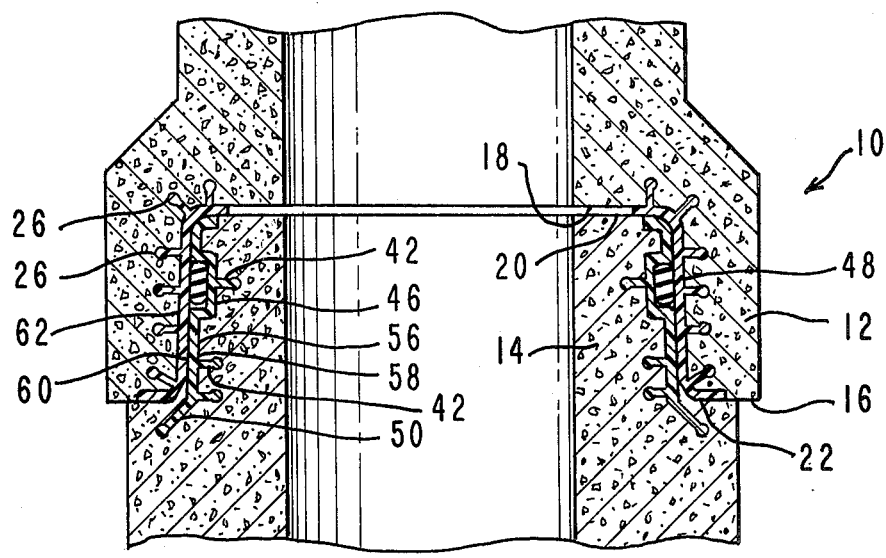
FIG. 1
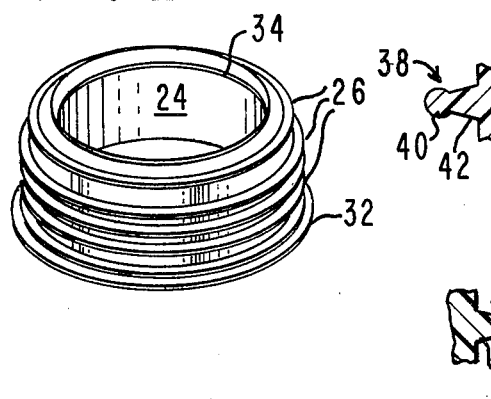
FIG. 2    FIG. 6b    FIG. 3
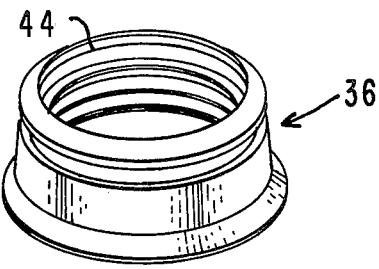
FIG. 4    FIG. 6a    FIG. 5
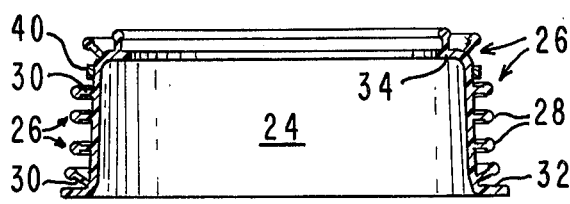
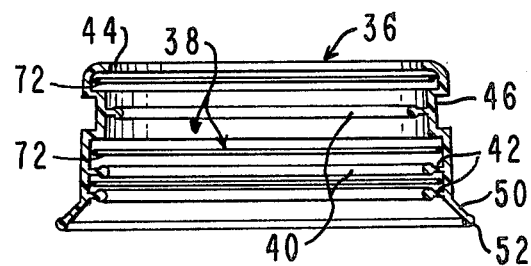

PIPE COMPRESSION SEAL FOR BELL AND SPIGOT JOINT

This invention relates to an improved seal system for a bell and spigot joint in non-metallic pipes such as concrete. The seal system of this invention will permit the use of such pipe for low-head internal pressures not previously believed attainable in such pipe structures.

In my prior U.S. Pat. No. 4,186,931 there was described a joint system for non-metallic pipes which comprised a spigot end ring and a bell end ring, which rings respectively were mounted on the spigot and bell ends of such pipes. The joint system described therein was intended to seal the joint formed when the bell end is telescopically engaged over the spigot end of a complementary pipe. As described therein, the sealing systems which have characterized the prior art achieve some seal but fail to produce a smooth surface-to-surface engagement. Although the joint between two end seals may be sealed, itself, a leakage path often occurs along the interface between the seal and the pipe member. In order to overcome this problem, the seal described in my prior patent utilized a plurality of mutually spaced stand-off members or circumferential flanges which were molded directly into the ends of the pipes. These members then form a seal between the ring member and the pipe at its interface.

The seal as described therein is entirely adequate for sewer, storm drain, and culvert pipe which generally does not require that the joint withstand high internal pressures. For example, in the American Society for Testing and Materials (ASTM) specification C14-74 entitled "Concrete Sewer, Storm Drain and Culvert Pipe", the physical requirements for hydrostatic tests are that the pipe withstand an internal hydrostatic pressure of 10 psi for 10 minutes without leakage.

It has been discovered, however, that a modification of this joint system will provide a seal effective at much higher internal hydrostatic pressures so that the improved joint of this invention will not only meet the above ASTM specification, but will also meet ASTM specifications C76-74 for Reinforced Concrete Culvert, Storm Drain and Swere Pipe, and ASTM specification C361-74, Reinforced Concrete Low-Head Pressure Pipe. Therefore the improved seal of this invention provides a much more versatile conduit system including non-metallic piping with bell and spigot joints sealed by the improved bell and spigot sealing rings of this invention. The improved seal relies upon an additional flange carried by the spigot sealing ring which is embedded in the offset end of the spigot member and a concave depression also embedded in the spigot end which carries an O-ring sealing member. The combination of a plurality of mutually spaced circumferential flanges embedded in the interface between, respectively, the bell sealing ring and the bell end of the pipe and the spigot sealing ring and the spigot end of the pipe with these additional features provides a pressure seal which has been found to withstand at least 50-60 psi internal hydrostatic pressure and probably much greater pressure.

Accordingly, it is an object of this invention to provide an improved seal joint for non-metallic pipe which effectively seals a bell and spigot joint against internal, and to some degree external, hydrostatic pressure.

It is another object of this invention to provide a seal which is economical to manufacture but which will provide an effective seal for concrete bell and spigot joints.

It is yet another object to provide bell and spigot sealing rings which are embedded in the bell and spigot joints of respective ends of concrete pipes which when the spigot end is telescopically received in the bell end will compress and seal the interface between the ring and the pipe against internal hydrostatic pressure at least about 50-60 psi.

These and other objects will become readily apparent with reference to the drawings and following description, wherein:

FIG. 1 is a fragmentary cross-sectional view of a concrete bell and spigot joint sealed with the joint system of this invention;

FIG. 2 is a perspective view of the bell end sealing ring of this invention;

FIG. 3 is a perspective view of the spigot end sealing ring of this invention;

FIG. 4 is a cross-sectional view taken along lines 4—4 of FIG 2;

FIG. 5 is a cross-sectional view taken along lines 5—5 of FIG. 3; and

FIGS. 6a and 6b are fragmentary cross-sectional views of typical flanges.

With attention to FIG. 1, the joint 10 shown therein consists of a bell end 12 and a spigot end 14. Formation of the joint system embedded in the respective pipe ends is described in my aforementioned U.S. Pat. No. 4,186,931. Accordingly, the disclosure of that patent is hereby incorporated by reference.

The pipe ends typically are made of concrete and may be reinforced as is obvious to those skilled in the art. The joint system of this invention is intended to seal the pipe joint against hydrostatic pressure from within and without. The bell end 12 is formed with an end face 16 and an axially and radially displaced offset face 18. Similarly, the spigot end 14 is formed with an end face 20 and an axially and radially displaced offset face 22.

With attention to FIGS. 2, 4 and 6A, the joint system of this invention includes a bell sealing ring 74 having a plurality of offset ridges or outstanding members 26 which are mutually spaced around the outside thereof and intended to be imbedded in bell end 12. Each of said members is flange-like in appearance, and each has a terminal bead 28 of greater diameter than the wedge-shaped central portion 30 of each member 26. A lip flange 32 surrounds the bell opening and is intended to be embedded in the bell end face 16 and seat against the spigot off-set face 22. Similarly, a lip 34 is also provided at the opposite end to seat between the bell offset face 18 and the spigot end face 20.

With attention to FIGS. 3, 5 and 6B, there is pictured the spigot end ring 36. Ring 36 similarly has a pluraity of mutually spaced inwardly directed flange-like members 38 which extend circumferentially around the ring and are intended to be embedded in spigot end 14. Each member 38 has a terminal bead 40 which is of greater diameter than the wedge-shaped central portion 42 of members 38. An upper lip 44 is also provided. Lip 44 is intended to seat in the offset end face 20 of spigot 14 and against lip 34 of bell end ring 24.

Spigot end ring 36 forms a concave groove 46 which extends circumferentially therearound. Groove 46 is intended to receive an O-ring 48, and is embedded in the spigot end 14. Furthermore, a flange 38 having a bead 40 is centrally located on the inward surface of the concave groove 46.

Furthermore, an additional downwardly extending flange 50 having a terminal bead 52 is mounted at the lower portion of ring 36. Flange 50 extends circumferentially around ring 36 and is intended to extend at an acute angle into spigot end 14 below offset face 22, as shown in FIG. 1. Flange 50 then is coaxially mounted on ring 36, but in contrast to flanges 38, flange 50 extends outwardly at an acute angle to the plane of rotation containing ring 36, and to offset face 22 of spigot member 14.

With attention to FIG. 1, the joint system 10 of this invention then includes a spigot end ring 36 having an interface surface 56 and an outer surface 58. Also there is provided a bell end sealing ring 24 having an inner surface 60 and an interface surface 62. Flange members 26 extend into the bell end 12 from the inner surface 62 of ring 24, and flange members 42 and 50 extend into the spigot end 14 from the interface surface 56 of ring 36. The outer surface 58 of ring 36 and the inner surface 60 of ring 24 abut with O-ring 48 therebetween when spigot end 14 is telescoped within bell end 12.

The flange members 50, 42, and 26, together with the concaved groove 46 seal the respective interface surfaces against leakage. Compression of the surfaces 58 and 60 with the O-ring 46 therebetween seal the abutting surfaces. Furthermore, lips 32 and 34 on ring 24 serve to further seal the abutting surfaces.

As noted above, the joint system of this invention will, as in the seal of U.S. Pat. No. 4,186,931, meet the ASTM standard specification for Concrete, Sewer, Storm Drain and Culvert Pipe. (C14-74). In addition, however, the joint system of this invention will also meet the specifications for Reinforced Concrete, Culvert, Storm Drain, and Sewer Pipe, and the specification for Reinforced Concrete Low-Head Pressure Pipe (C361-74). According to that specification, the water tightness of the joints shall be tested under hydrostatic heads of 120% of the pressure for which the pipe is designed. As noted above, the seal of this invention has been tested to 54 and 55 psi without leakage and is expected to withstand a much higher hydrostatic head.

With attention to FIG. 4, the bell end 12 is formed on a pallet (not shown) and band 70 is intended to secure seal member 24 to the pallet. Band 70 then eliminates the likelihood that the concrete slurry will flow between seal 24 and the pallet.

As shown in FIG. 5, a plurality of expanding rings 72 are similarly provided to hold seal 36 against a header (not shown) when the spigot end 14 is formed. Rings 70 prevent the concrete slurry from entering between seal 36 and the header.

The seal effect is enhanced by compression of the flanges 26 and 42 during manufacture, as well as the pressure caused by the O-ring gasket 48 pressing against the inner surface 60 of ring 24. The gasket 48 pressing against sealing surfaces when the joint is assembled produces a linear "corking" effect, sealing the joint. The embedded groove 46 with an additional flange member 38 extending inwardly therefrom further enhances the sealing effect of the joint of this invention. Finally, the internal pressure within the conduit futher enhances the sealing effect by pressing both the bead rings and flat surfaces of rings 24 and 36 into the concrete behind them to further seal the interfacial surfaces.

Accordingly, the device of this invention provides an improved seal for a concrete spigot and bell joint. The sealing rings are preferably manufactured of a plastic material such as polyvinylchloride or similar material and are cast around said rings as is known in the art. The finished product then is a concrete pipe having a bell end and a spigot end with each end mounting in sealing rings so that when respective bell and spigot ends of like pipe are telescoped thereinto sufficient seal will be produced to provide a low-head pressure pipe.

While a specific embodiment for the invention has been shown and described in detail, it will be understood that the invention may be modified without departing from the spirit of the inventive principles as set forth in the appended claims.

I claim:

1. A pressure resistant system for joining concrete pipes in end-to-end relationship wherein said first pipe terminates in a bell end and the second pipe terminates in a complimentary spigot end telescopically received therein, the bell end defining a bell end face and an internal offset face radically and axially offset from the bell end face, and the spigot end defining a spigot end face and an external offset face radially and axially offset from the spigot end face, the end face and offset face of said bell end of said spigot being connected, respectively, by inner and outer seal mounting surfaces, said system comprising:

a bell end sealing ring extending from the bell offset face to the bell end face along the bell seal mounting surface, said ring mounting a plurality of mutually spaced, outwardly directed, circumferential flanges embedded in said bell;

a spigot end sealing ring extending from the spigot offset face to the spigot end face along the spigot seal mounting surface, said ring mounting a plurality of mutually spaced, inwardly directed, circumferential flanges embedded in said spigot, the end of said ring adjacent said spigot offset face mounting an integral sealing flange extending outwardly at an angle thereto and embedded in said pipe below the spigot offset surface, said ring further defining a central, circumferential, concave groove embedded in said spigot; and an O-ring seal retained in the spigot ring groove between the spigot and bell sealing rings when the spigot end is telescopically received in the bell end.

2. The system of claim 1 wherein an inwardly directed circumferential flange is mounted on the inner surface of the spigot ring groove and extends into said spigot end.

3. The system of claim 2 wherein said bell sealing ring includes inwardly and outwardly directed lips disposed, respectively, along a portion of the bell offset and bell end faces, the inwardly directed lip mounting a circumferential flange extending into the offset face.

4. The system of claim 3 wherein the outwardly directed flange mounted on the spigot end sealing ring extends at an acute angle on the spigot end offset face.

5. The system of claim 4 wherein the spigot end sealing ring mounts a circumferential inwardly directed, lip extending along a portion of the spigot end face.

* * * * *